Nov. 7, 1967   R. BARRADELL-SMITH ETAL   3,351,451
APPARATUS FOR FORMING GLASS RIBBON ON MOLTEN METAL
WITH GAS SEAL MEANS
Filed Oct. 11, 1963   4 Sheets-Sheet 1
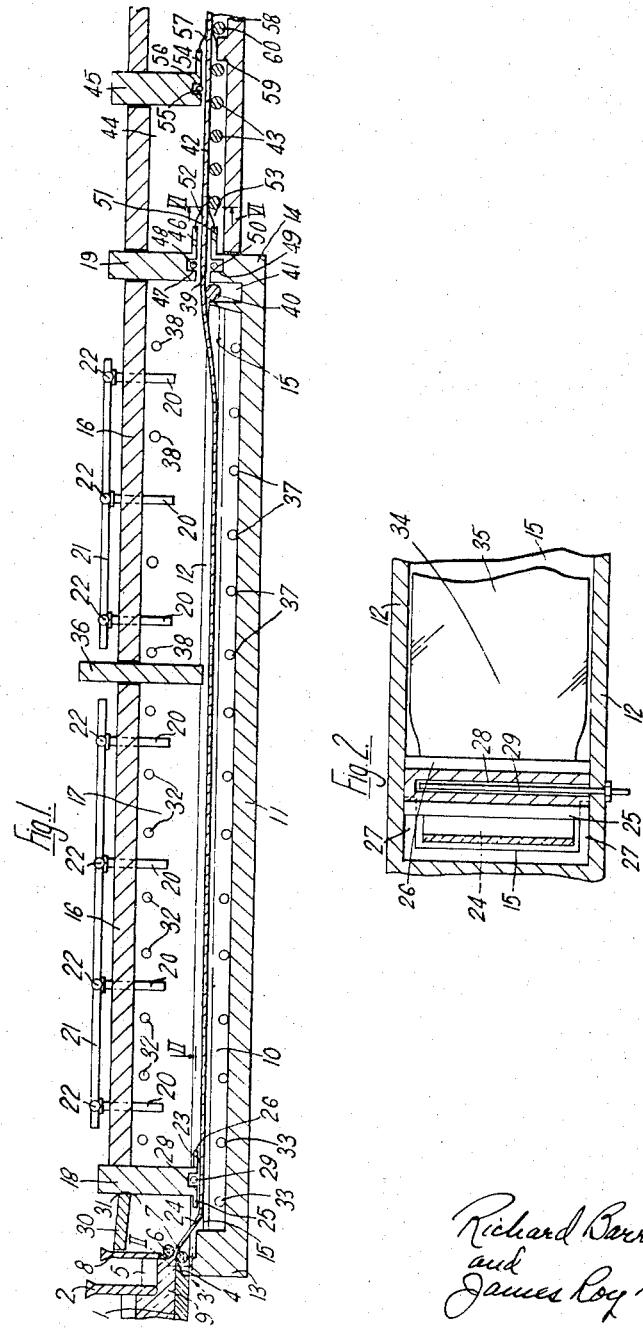
Richard Barradell-Smith
and
James Roy McLaggan
Inventors
By
Morrison, Kennedy & Campbell
Attorneys

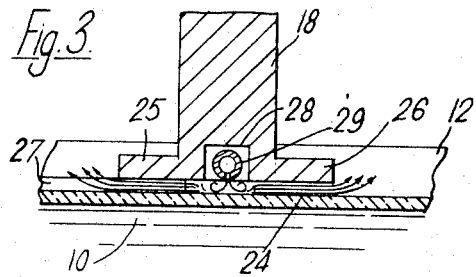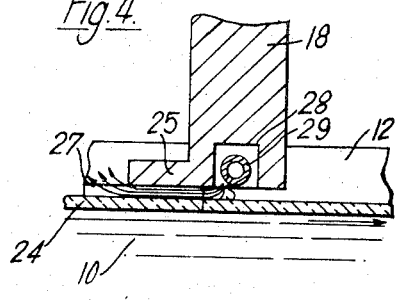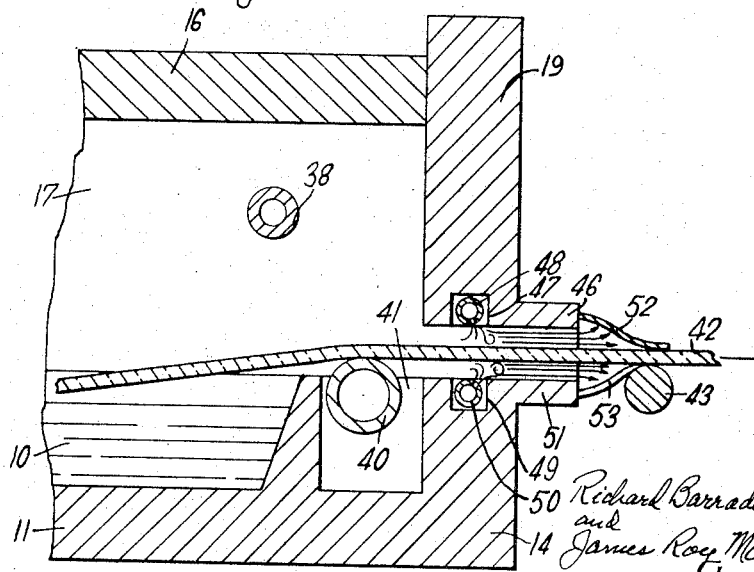

Nov. 7, 1967  R. BARRADELL-SMITH ETAL  3,351,451
APPARATUS FOR FORMING GLASS RIBBON ON MOLTEN METAL
WITH GAS SEAL MEANS
Filed Oct. 11, 1963  4 Sheets-Sheet 3
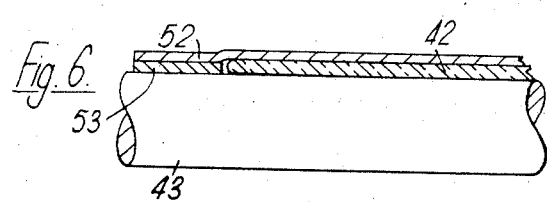
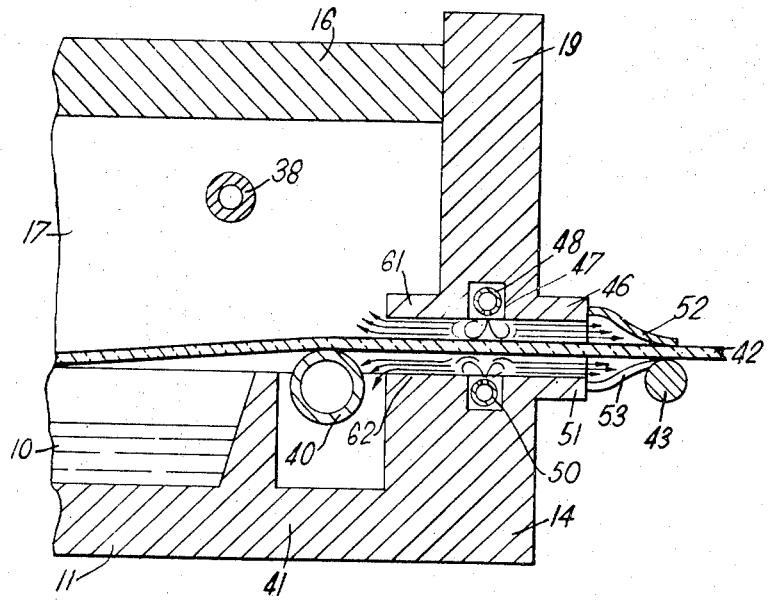
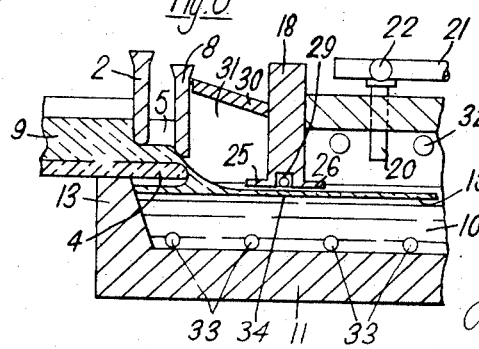
Richard Barradell-Smith
and
James Roy McLaggan
Inventors
Morrison, Kennedy & Campbell
By
Attorneys

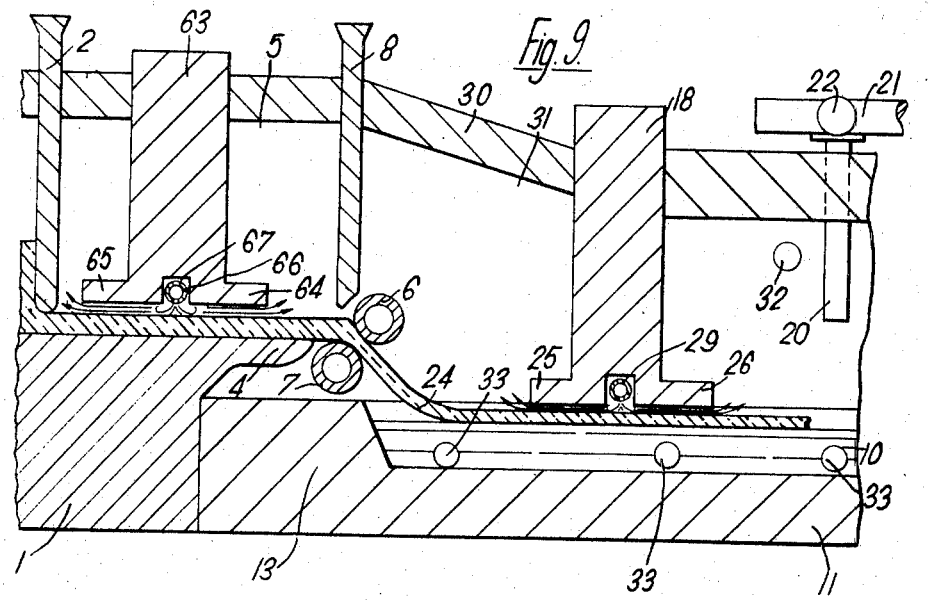
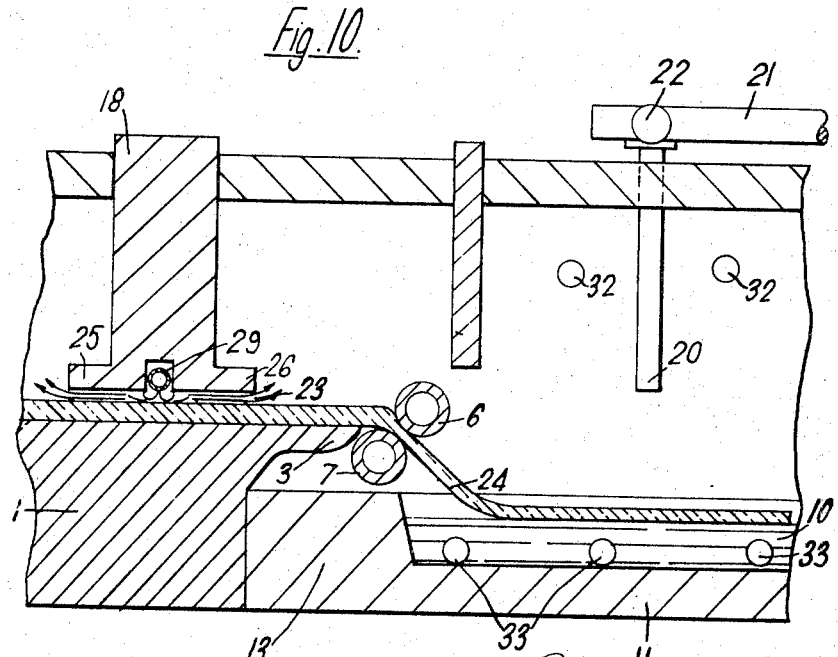

United States Patent Office 3,351,451
Patented Nov. 7, 1967

3,351,451
APPARATUS FOR FORMING GLASS RIBBON ON MOLTEN METAL WITH GAS SEAL MEANS
Richard Barradell-Smith, St. Helens, and James R. Mc-Laggan, Windle, St. Helens, England, assignors to Pilkington Brothers Limited, Liverpool, England, a corporation of Great Britain
Filed Oct. 11, 1963, Ser. No. 315,616
Claims priority, application Great Britain, Oct. 11, 1962, 38,625/62
10 Claims. (Cl. 65—157)

This invention relates to the manufacture of flat glass, and in particular to apparatus for manufacturing flat glass during which the glass becomes supported on molten metal.

In the manufacture of flat glass during which the glass becomes supported on molten metal, for example tin or a tin alloy in which tin predominates, it is known to provide over the glass on the molten metal a roof structure or tunnel having end walls. The molten metal on which the glass is supported is such as to have all the characteristics as fully described in United States Patent No. 2,911,759 for the molten metal bath.

It is a main object of the present invention to provide an improvement in the manufacture of flat glass during which the glass is supported on molten metal.

According to the present invention there is provided apparatus for manufacturing flat glass during which the glass becomes supported on molten metal over which a headspace is confined by a tunnel over the molten metal and end walls to the tunnel, sealing the channel for the passage of the glass relative to an end wall against the ingress of external atmosphere by creating a laminar flow of a protective gas through the channel for the glass in a direction opposing the direction of ingress of external atmosphere.

According to one aspect of the present invention there is provided apparatus for manufacturing flat glass during which the glass becomes supported on molten metal over which a headspace is defined by a roof and end walls, creating laminar flow of a protective gas through a channel for the passage of glass and communicating with the headspace, the rate of flow of said protective gas being sufficient to seal the channel against ingress of external atmosphere.

Preferably the flat glass is manufactured in ribbon form by a method during which the glass is advanced along a bath of molten metal. A headspace, confined over the bath by a roof structure including end walls, is charged with a protective atmosphere maintained at a plenum.

In the manufacture of flat glass according to the preferred aspect of the invention during which the glass is supported on a bath of molten metal, the headspace over the bath being charged with a protective atmosphere maintained at a plenum, outward laminar flow of protective gas is created through a channel communicating with the headspace, the rate of flow of said protective gas being sufficient to seal the channel against ingress of external atmosphere to the protective atmosphere.

Because of the outward laminar gas flow through the channel turbulence in the channel is minimised and substantially no external atmosphere is drawn into the headspace.

Further the invention contemplates the manufacture of flat glass in ribbon form during which the glass is supported on a bath of molten metal, the headspace over the bath being charged with a protective atmosphere maintained at a plenum, creating outward laminar flow of protecting gas through a channel for the glass communicating with the headspace, the rate of flow of said protective gas being sufficient to seal the channel against ingress of external atmosphere to the protective atmosphere.

Preferably said outward laminar flow of protecting gas is created through a channel for the glass established under a defining wall of the headspace.

The glass may be advanced along a bath of molten metal under thermal conditions which assures that the ribbon of glass is sufficiently stiff at the outlet end of the bath to permit it to be taken unharmed from the bath, the headspace over the bath being charged with a protective atmosphere maintained at a plenum, creating outward laminar flow of protective gas through an inlet channel and an outlet channel for the glass under defining walls of the headspace, the rate of flow of said protective gas being sufficient to seal the channels against ingress of external atmosphere to the protective atmosphere.

Desirably a formed ribbon of glass of predetermined dimensions is delivered to the bath at a controlled rate and is advanced along the bath through an inlet channel established across the bath under an end wall at the inlet end of the bath, confining said outward gas flow through the inlet channel under said wall and parallel to the surface of the ribbon of glass advancing through the channel.

Molten glass may be poured onto the bath at a controlled rate so as to advance the glass through an inlet channel established across the bath under a defining wall of the headspace at the inlet end of the bath, and along the bath under thermal conditions which assure that a layer of molten glass is established on the bath and a cooled ribbon of glass is developed from said layer, the cooled ribbon being sufficiently stiff to permit it to be taken unharmed out of the bath through said outlet channel, confining said outward gas flow through the inlet channel under said inlet defining wall and parallel to the surface of the molten glass advancing through the inlet channel.

Still further according to the invention there is provided apparatus by which molten glass is flowed along a forehearth at a controlled rate towards the inlet end of the bath through an inlet channel established across the forehearth under a defining wall of the headspace extending across the forehearth, said outward gas flow through the inlet channel is confined under said wall and is parallel to the surface of the molten glass flowing along the forehearth.

Preferably the molten glass is flowed along the forehearth at a controlled rate towards the inlet end of the bath for delivery to the bath through the inlet channel established across the bath under said inlet end wall, a plenum of protective atmosphere is established in a chamber defined between said inlet end wall and a partition extending across the forehearth to define a channel for the molten glass, and laminar flow of protective gas is created outwardly from said chamber under said partition, the rate of flow of said protective gas under the partition being sufficient to seal the channel against ingress of external atmosphere to the chamber atmosphere.

Desirably said laminar gas flow is created by delivering a curtain of gas extending across the channel for the glass towards the surface of the glass and directed contrary to the direction of advance of the glass, and confining the gas flow over the glass surface for a distance sufficient to minimise any turbulence in said laminar gas flow.

Alternatively said laminar gas flow is created by delivering a curtain of gas extending across the channel for the glass down on to the surface of the glass, and confining the gas flow over the glass surface both in the direction of advance of the glass and in the opposite direction for a distance sufficient in each said direction to minimise any turbulence in said gas flow outwardly from and inwardly to the headspace, thereby additionally to minimise escape of protective atmosphere from the headspace.

Further according to the invention outward laminar gas flow is created above and below the cooled ribbon of glass as it is discharged through the outlet channel. Alternatively if the ribbon is supported on means which prevents ingress of external atmosphere under the ribbon at the outlet from the bath, said outward laminar gas flow through the outlet channel may be created above the cooled ribbon only.

Preferably said gas flow through the outlet channel is created by delivering towards the upper and lower surfaces of the cooled ribbon of glass curtains of gas extending across the outlet channel above and below the ribbon, said gas curtains are delivered towards the glass in the direction of advance of the ribbon, and the gas flow is confined above and below the ribbon surfaces for a distance sufficient to minimise turbulence in said gas flow.

Alternatively said laminar gas flow is created by delivering on to the upper and lower surfaces of the cooled ribbon curtains of gas extending across the outlet channel above and below the ribbon, and confining the flow of gas above and below the ribbon both in the direction of advance of the ribbon and in the opposite direction for a distance sufficient to minimise any turbulence in said gas flow outwardly from and inwardly to the headspace, thereby additionally to minimise escape of protective atmosphere through the outlet channel.

In a preferred embodiment said gas curtains are directed towards the ribbon surfaces from locations directly oppostie each other in the outlet channel.

Additionally according to the invention the cooled ribbon of glass is delivered from the outlet channel through a chamber defined between said outlet end wall and the front wall of an annealing lehr and through an entrance to the lehr defined under said front wall, a plenum of protective atmosphere is maintained in said chamber by gas flow through the outlet channel, and laminar flow of protective gas is created outwardly from the chamber through said lehr entrance at a rate sufficient to seal the lehr entrance against ingress into said chamber of atmosphere from the annealing lehr.

From one aspect the invention comprehends apparatus for use in the manufacture of flat glass during which glass is advanced through a chamber having end walls respectively defining inlet and outlet channels for the glass, comprising means for maintaining a plenum of atmosphere in the chamber, and comprised in at least one of said end walls means for creating laminar gas flow outwardly through the channel defined by that wall, the rate of flow of said gas being sufficient to seal the channel against ingress of external atmosphere through said channel into the chamber.

Further the invention comprehends apparatus for use in the manufacture of flat glass comprising a tank structure containing a bath of molten metal, a roof structure defining a headspace over the bath, means for supplying protective atmosphere to said headspace and for maintaining therein a plenum of said atmosphere, means for delivering glass to the bath through an inlet channel and for advancing the glass along the bath towards an outlet channel through which the glass is discharged from the bath, and means for creating outward laminar gas flow through the inlet channel and the outlet channel at a rate sufficient to seal the channels against ingress of external atmosphere to the protective atmosphere.

In a preferred embodiment of the invention the roof structure includes an inlet end wall extending downwardly and across the bath at the inlet end of the bath, said inlet end wall comprising at its lower end a laterally extending surface disposed close to the surface of the bath to define therewith the inlet channel for the glass and an angularly adjustable apertured pipe exposed towards the surface of the bath, said pipe being arranged for connection to means for supplying protective gas to the pipe, and the angular setting of said pipe being such that a curtain of gas is delivered towards the glass advancing through the inlet channel to create said outward laminar gas flow through the inlet channel.

The invention also comprehends apparatus as set out above in combination with a furnace arranged to supply molten glass continuously to a forehearth along which the molten glass is flowed at a controlled rate towards the inlet end of the bath, and the roof structure defining the headspace includes an inlet end wall extending downwardly and across the forehearth, said inlet end wall comprising at its lower end a laterally extending surface disposed parallel to the floor of the forehearth to define therewith an inlet channel through which molten glass flows and an angularly adjustable apertured pipe exposed towards the forehearth, said pipe being arranged for connection to means for supplying protective gas to the pipe, and the angular setting of the pipe being such that a curtain of gas is delivered from the pipe towards the surface of the molten glass to create said outward laminar gas flow through the inlet channel.

Alternatively the invention comprehends apparatus as set out above in combination with a furnace arranged to supply molten glass continuously to a forehearth along which the molten glass is flowed at a controlled rate towards the inlet end of the bath wherein the roof structure comprises a partition extending downwardly and across the forehearth to define a channel for the molten glass over the forehearth, said partition defining with the inlet end wall a chamber enclosing means for delivering glass at a controlled rate to the bath and advancing the glass along the bath through said inlet channel, said partition comprising a laterally extending surface disposed close to the upper surface of the molten glass flowing along the forehearth and an angularly adjustable apertured pipe exposed towards the molten glass, said pipe being arranged for connection to means for supplying protective gas to the pipe, and the angular setting of the pipe comprised in the partition being such that a curtain of gas is delivered towards the molten glass in opposite direction to the direction of flow of the glass, gas flow from said curtain of gas being confined under said laterally extending surface to create outward laminar gas flow under the partition at a rate sufficient to seal said channel over the forehearth against ingress of external atmosphere to the chamber atmosphere.

The laterally extending surface may extend both in the direction of advance of the glass and in the opposite direction and the apertured pipe is set in a groove formed centrally in said surface to direct a curtain of protective gas down on to the surface of the glass so that protective gas flows away from the curtain in both directions under the surface to produce laminar gas flow in both directions, thereby additionally to prevent escape of protective atmosphere through the channel into the external atmosphere.

In the preferred embodiment of the invention the outlet channel is defined between the tank end wall and an outlet end wall comprised in the roof structure and extending downwardly therefrom and across the bath, the upper surface of the tank end wall and the lower surface of the outlet end wall both extend laterally parallel to the path of the ribbon of glass, and the two end walls each comprise an angularly adjustable apertured pipe exposed towards the ribbon and arranged for connection to a supply of protective gas, the angular setting of the pipes being such that a curtain of gas is delivered from each pipe towards the ribbon in the direction of movement of the ribbon to create said outward laminar gas flow above and below the ribbon surfaces through the outlet channel.

The two pipes may be located directly opposite each other in grooves in the walls.

Alternatively the laterally extending surfaces extend from the end walls both in the direction of movement of the ribbon and in the opposite direction and the pipes are angularly set to direct curtains of gas on to the surfaces of the ribbon so that protective gas moves in both directions between said surfaces and the ribbon to produce laminar gas flow in both directions, thereby additionally to prevent loss of protective atmosphere from the headspace through the outlet channel.

Two flexible aprons may be respectively attached to the outlet end wall of the roof structure at each side of the outlet channel so that they overlie the edges of the ribbon of glass, and two lower flexible aprons fixed to the tank end wall and extending over a first supporting roll for the ribbon leaving the outlet channel, the flexible aprons overlying each other on said supporting roll to assist in sealing the outer edges of the outlet channel.

Apparatus according to the invention also comprises a chamber extending between the outlet end wall of the roof structure and the front wall of an annealing lehr, and supporting rolls for the cooled ribbon mounted in the chamber to carry the ribbon through an entrance to the lehr defined under said front wall, wherein said lehr front wall comprises a laterally extending surface extending in the direction of advance of the ribbon and an angularly adjustable apertured pipe extending across the lower face of the wall, said pipe being arranged for connection to means for supplying protective gas to the pipe for discharge therefrom as a curtain of gas directed under said laterally extending surface to create laminar gas flow between said surface and the upper surface of the ribbon of glass at a rate sufficient to seal the lehr entrance against ingress into said chamber of atmosphere from the annealing lehr.

In order that the invention may be more clearly understood some embodiments thereof will now be described, by way of example, with reference to the accompanying drawings in which:

FIG. 1 is a sectional elevation of apparatus according to the invention for use in the manufacture of flat glass, including apparatus for delivering a rolled ribbon of glass at a controlled rate on to a bath of molten metal, FIG. 2 is a section on line II—II of FIGURE 1, FIG. 3 is an enlarged view of the input end wall shown in FIGURES 1 and 2, FIG. 4 illustrates an alternative construction of the input end wall, FIG. 5 is an enlarged view of the outlet channel for the glass from the bath of molten metal, illustrated in FIGURE 1, FIG. 6 is a section on line VI—VI of FIGURE 1, FIG. 7 is a view similar to FIGURE 5 of a modified construction of the outlet end wall, FIG. 8 is a sectional elevation corresponding to FIGURE 1 and showing another method of delivering glass at a controlled rate to a bath of molten metal, FIG. 9 is a sectional elevation corresponding to FIGURE 1 illustrating a modified construction in which laminar gas flow is created over the surface of molten glass flowing towards the inlet to the bath, and FIG. 10 is a view similar to FIGURE 9 illustrating another modified construction for carrying out the invention.

In the drawings like references indicate the same or similar parts.

Referring to FIGURES 1 and 2 of the drawings a forehearth of a continuous glass-melting furnace is indicated at 1, a regulating tweel at 2 and a spout at 3, the spout comprising a "lip" 4 and side jambs 5, the side jambs and lip forming a spout of generally rectangular cross-section. A cover may be secured over the spout in known manner.

Operatively associated with the spout 3 are a pair of water-cooled casting rolls 6 and 7 which are mounted in side frames driven by power means, not shown. A gate 8 is adjustably suspended in a vertical plane in contiguity with the upper casting roll 6 and the gate 8 shields the roll 6 from heat radiated from molten glass 9 flowing from the forehearth 1 over the lip 4 of the spout 3 to the pass between the casting rolls 6 and 7.

The upper casting roll 6 is disposed slightly in advance of the lower casting roll 7 so that molten glass 9 flows from the lip 4 on to the upper part of the roll 7 which thus presents to the glass 9 a downwardly and forwardly directed arcuate casting bed moving in the same direction as the direction of flow of the glass 11 from the spout. Thus the molten glass 9 on leaving the spout 3 and arriving on the lower casting roll 7 is constrained to flow forwardly thereby preventing backward flow of molten glass under the spout 3.

The ribbon forming means comprising casting rolls 6 and 7, just described, is disposed over one end of a tank structure which contains a bath 10 of a molten metal, for example, molten tin or a tin alloy in which tin predominates. The tank comprises a floor 11, side walls 12, an end wall 13 at the inlet end of the tank, above which end wall 13 the ribbon forming means is mounted, and an end wall 14 at the outlet end of the tank. The side walls 12 and the end walls 13 and 14 are integral with each other and with the floor 12. The level of the surface of the bath 10 is indicated at 15 in FIGURE 1.

The tank structure supports a roof structure bridging the bath 10 and including a roof 16, side walls 17, an end wall 18 at the inlet end of the bath and an end wall 19 at the outlet end of the bath so that the roof 16 and side walls 17 provide a tunnel over the bath 10 and define with the end walls 18 and 19 a headspace over the bath.

The headspace is charged with a protective atmosphere maintained at a plenum, the protective atmosphere being a non-oxidising gas which prevents the formation in the bath of contaminants for the glass. The headspace is charged with protective atmosphere through vertical ducts 20 arranged at intervals in the roof structure 16. The ducts 20 are connected to headers 21 by transversely arranged branches of the headers indicated at 22.

The end wall 18 at the inlet end of the tank extends downwardly into the tank structure and defines an inlet channel 23 through which a formed ribbon of glass 24 is delivered by the casting rolls 6 and 7 to the bath. The bottom of the end wall 18 is formed with two laterally extending shelf-like feet 25 and 26 extending respectively towards the rolls 6 and 7, and into the headspace over the bath. The foot 25 rests on ledges 27 at each side of the tank and the sides of the ledges 27 define with the foot 25 the beginning of the inlet channel through which the formed ribbon of glass 24 is delivered to the bath. The laterally extending lower surfaces of the feet 25 and 26 are close to and parallel to the upper surface of the ribbon of glass 24 as it advances through the inlet channel 23.

As illustrated in detail in FIGURE 3, the lower surface of the end wall 18 is formed with a groove 28 in its centre, which groove extends across the wall from one end. An angularly settable slotted pipe 29 is inset in this groove and the outer end of the pipe 29 passes through the side wall 12 of the tank for connection to means for supplying protective gas to the pipe. Protective gas is supplied to the pipe 29 under pressure and the angular setting of the pipe is such that a curtain of gas extending across the inlet channel 23 is delivered down on to the upper surface of the ribbon of glass 24.

Protective gas from the curtain is confined over the upper surface of the ribbon 24 both under the foot 26 in the direction of advance of the glass and in the contrary outward direction under the foot 25.

As the gas leaves the slot in the pipe 29 its flow is turbulent, but this turbulent flow is eliminated or minimised so that the gas flow is converted into laminar flow as indicated in FIGURE 3, as the gas passes under the feet 25 and 26. The feet 25 and 26 are sufficiently wide relative to their distance from the surface of the ribbon to enable laminar flow to be created from the turbulent flow before the gas escapes from the inlet channel 23. For example, the lower surface of each foot 25, 26 may be 8" wide and may be mounted 1" above the upper surface of the ribbon 24. The rate of flow of protective gas in the laminar gas flow under the feet 25 and 26 is sufficient to minimise any turbulence in the gas flow thereby to seal the channel against ingress of atmosphere from a chamber enclosing the rolls 6 and 7 and defined between the gate 8 and the inlet end wall 18, through the inlet channel 23 to contaminate the protective atmosphere in the headspace over the bath 10, and additionally to minimise escape of protective atmosphere from the headspace through the inlet chanel 23. As will be seen, each of the laterally extending surfaces above referred to is unbroken outwardly of its pipe.

In a simplified construction of the input end wall 18 as illustrated in FIGURE 4, the wall has only one foot 25 and the pipe 29 is angularly positioned so that the curtain of gas delivered from the pipe is directed contrary to the direction of advance of the ribbon of glass 24. The gas flow confined under the foot 25 includes some protective atmosphere from the headspace which is entrained in the curtain of gas delivered from the pipe 29.

As shown in FIGURE 1 the chamber between the gate 8 and the end wall 18 is closed by a cover 30 and has side walls 31, and a plenum of protective gas is maintained in this chamber.

In an alternative construction two pipes may be inset into the under surface of the inlet end wall 18, and are angularly set so that they deliver curtains of gas in opposite directions respectively under the foot 25 and the foot 26.

The formed ribbon of glass 24 is delivered on to the surface 15 of the bath 10 at a controlled rate by the casting rolls 6 and 7, and the ribbon is advanced through the inlet channel into the tunnel defined by the bath 10, the roof 16, the side walls 17 and the end walls 18 and 19. In this tunnel, in the embodiments described herein by way of example, thermal conditions are maintained by temperature regulators, shown as heaters 32 mounted in the roof 17 and heaters 33 immersed in the bath, which assure that the ribbon 24 is melted and a layer 34 of molten glass is thereby established on the bath. As the glass is advanced along the bath it flows laterally unhindered to the limit of its free flow until there is developed on the surface of the bath 10 a buoyant body 35 of molten glass in ribbon form.

The configuration of the tank at the level 15 of the bath surface, and the rate of delivery of the rolled ribbon of glass 24 to the bath are related so that the sides of the buoyant body of glass 35 never reach the side walls 12 of the tank and remain spaced therefrom as shown in FIGURE 2.

The buoyant body 35 is advanced along the bath under a partition 36 extending downwardly from the roof structure 16 and extending across the bath and thermal regulators 37 immersed in the bath at the outlet end of the tank and heaters 38 in the roof above the outlet end of the tank regulate the temperature of the metal bath by creating a temperature gradient such that the buoyant body 35 is stabilised and cooled, being sufficiently stiff by the time it reaches the outlet end of the bath to permit it to be taken unharmed out of the bath through an outlet channel 39 established across the bath under the outlet end wall 19 and above the end wall 14 of the tank. The cooled ribbon, which has a uniform thickness and flat parallel surfaces is lifted from the surface of the molten bath by a take-up roll 40 mounted in a pit 41 formed in the by a take-up roll 40 mounted in a pit 41 formed in the end wall 14 of the tank. The roll 40 lifts the stiffened ribbon of glass 42 from the surface of the bath.

As described in our co-pending patent application No. 315,615 the roll may be of stainless steel or carbon.

From the take-up roll 40 the ribbon of glass 42 passes through outlet channel 39 and is supported by rolls 43 in a chamber 44 extending beyond the end wall 19 and defined between the end wall 19 and a wall 45 which is the front wall of an annealing lehr, not shown, through which the ribbon travels for annealing. The tractive effort from the lehr maintains the ribbon moving along the bath.

In order to prevent contamination of the protective atmosphere in the headspace over the bath by flow of atmosphere through the outlet channel 39 from the chamber 44, outward laminar flow of protective gas which is preferably heated is created through the outlet channel 39 both above and below the ribbon of glass 42.

The take-up roll 40 and the supporting rolls 43 are arranged so that the ribbon of glass 42 moves through the centre of the outlet channel 39. The end wall 19 is formed with a laterally extending surface or foot 46 disposed close to and parallel to the upper surface of the ribbon of glass 42 and extending into the chamber 44, as illustrated in FIGURES 1 and 5.

A groove 47, similar to the groove 28 in the inlet end wall 18, is formed in the lower end of the wall 19. The groove 47 extends along the length of the wall 19 and an angularly adjustable slotted pipe 48 is inset in the groove 47 and exposed towards the upper surface of the ribbon 42. Hot protective gas is supplied under pressure to the pipe 48 which delivers from a slot extending along its length a curtain of gas extending across the outlet channel 39 above the cooled ribbon of glass. The pipe 48 is set so that the curtain of gas is delivered towards the ribbon in the direction of advance of the ribbon 42 and gas flow is confined between the lower face of the foot 46 and the upper surface of the ribbon 42. The width of the foot 46 and the height of its lower surface above the ribbon are such that laminar gas flow is created outwardly from the headspace above the surface of the ribbon 42 as indicated in FIGURE 5. As the gas leaves the slot in the pipe 48 its flow is turbulent, but this turbulent flow is minimised and converted into laminar flow as the gas passes under the foot 46. For example, the lower surface 46 may be 8" wide and may be mounted 1" above the upper surface of the ribbon 42.

Similarly, the upper face of the outlet end wall 14 of the tank is grooved along its length as indicated at 49 and an angularly adjustable slotted pipe 50 is inset in the groove 49. The wall 14 is formed with a foot 51 extending into the chamber 44 below the ribbon of glass and the two grooves 47 and 49 are disposed directly opposite each other in the outlet channel.

Hot protective gas under pressure is supplied to the pipe 50 and a gas curtain discharged from the pipe 50 is delivered towards the ribbon in the direction of advance of the ribbon 42, and the gas flow under the lower surface of the ribbon 42 is confined between the foot 51 and the ribbon so that laminar gas flow is also created under the lower surface of the ribbon 42.

The rate of flow of the laminar flow of protective gas above and below the surface of the ribbon 42 in the direction of advance of the ribbon is sufficient to seal the outlet channel against ingress of atmosphere from the chamber 44 through the outlet channel 39 into the protective atmosphere in the headspace.

The supporting rolls 43 for the ribbon 42 in the chamber 44 are wider than the ribbon of glass 42 and so is the outlet channel 39. In order to complete sealing of the outlet channel 39 aprons 52 and 53 of woven asbestos material are fixed to the feet 46 and 51. The apron 52 extends right across the outlet, and the apron 53 is provided only at either side of the ribbon of glass 42 as shown in FIGURE 6. The apron 52 overlies the aprons 53 on the first roll 43 as indicated in FIGURE 6. Protective gas is constantly blowing through the space between the aprons, and between the apron 52 and the upper surface of the ribbon of glass 42 so that an effective seal is provided along the whole length of the outlet channel 39.

The front wall 45 of the annealing lehr extends downwardly to define an entrance to the lehr from the chamber 44. The lower end of the wall 45 is in proximity with the upper face of the stiff ribbon of glass as it passes into the annealing lehr, and the lower end of the wall 45 may be formed in the same way as the wall 19, with a laterally extending foot 54 and an angularly adjustable slotted pipe 55 inset in a groove 56. Laminar gas flow is created under the foot 54, and aprons of woven asbestos material 57 and 58 mounted respectively on the foot 54 and on a wall 59 extending up from the floor of the chamber 44, complete the seal at the outlet from the chamber 44. The aprons 57 and 58 extend right across the wall 45; the apron 57 falls on to the upper surface of the ribbon of glass, and the apron 58 is held, by the first supporting roll 60 of the annealing lehr, against the lower surface of the ribbon.

The chamber 44 provides a gas lock between the headspace over the bath 10 and the annealing lehr.

In an alternative construction illustrated in FIGURE 7 the end wall 19 is formed with a second foot 61 extending into the headspace and the end wall 14 is thicker than in the construction FIGURES 1 and 5, as indicated at 62. Curtains of protective gas are delivered from the pipes 48 and 50 straight on to the upper and lower surfaces of the cooled ribbon 42, and the flow of gas above and below the ribbon is confined by the feet 46 and 51 in the direction of advance of the ribbon, and by the foot 61 and the wall 62 in the opposite direction to produce laminar gas flow. The laminar flow between the ribbon 42, the foot 61 and the wall 62 into the headspace additionally minimises an escape of protective atmosphere from the headspace through the outlet channel.

Instead of regulating the delivery of glass to the bath by feeding a ribbon of glass of predetermined dimensions to the bath at a controlled rate, glass in molten form may be supplied direct to the bath from the spout 3 of the forehearth 1. Such a construction is illustrated in FIGURE 8, and the gate 8 in this construction controls the rate at which molten glass is delivered to the bath 10 to form the layer 34 of molten glass on the bath.

In the embodiment of the invention illustrated in FIGURE 1, a seal is provided between the chamber defined between the wall 18 and the gate 8, by the immersion of the lower end of the gate 8 in the molten glass 9 flowing to the rolls 6 and 7. Also in the modification illustrated in FIGURE 8 the chamber is sealed by the immersion of the lower end of the gate 8 in the molten glass 9 flowing over the spout 4.

Alternatively as illustrated in FIGURE 9 the height of the tweel 2 may be such that the gate 8 is not immersed in the molten glass 9 flowing to the rolls 6 and 7, and the molten glass 9 is flowed along the forehearth 1, at a rate controlled by the tweel 2, towards the inlet end of the bath through an inlet channel established across the forehearth under a refractory partition 63 of similar form to the inlet end wall 18 and formed at its lower end with two feet 64 and 65 extending respectively in the direction of flow of the molten glass and in the opposite direction.

Protective gas is supplied to a slotted angularly adjustable pipe 66 inset in a groove 67 in the lower face of the partition 63, and laminar flow of protective gas is created under the feet 64 and 65. The rate of flow of protective gas under the partition is sufficient to seal the channel under the partition against counterflow of contaminating atmosphere under the partition 63 into the chamber and to minimise escape of protective atmosphere from the plenum maintained in the chamber between the wall 18 and the partition 63.

The apparatus of FIGURE 9 may be modified by forming the partition 63 with only one foot 65 extending in opposite direction to the direction of flow of the molten glass, so that chamber atmosphere is entrained in the laminar gas flow under the foot 65 but the chamber is sealed against the counterflow under the partition 63 of atmosphere from outside the chamber. The chamber between the input end wall 18 and the partition 19 thus forms a gas lock through which glass is advanced towards the inlet end of the bath.

The construction of FIGURE 9 may be simplified as shown in FIGURE 10 by moving the input end wall 18 to the position occupied by the partition 63 in FIGURE 9. The inlet channel 23 through which glass is advanced to the bath is, in this construction, established across the forehearth 1, and the headspace over the bath beyond the casting rolls 6 and 7. Laminar gas flow is created under the input end wall 18, parallel to the surface of the molten glass 9 flowing over the forehearth, at a rate sufficient to seal the inlet channel against ingress into the protective atmosphere maintained at a plenum in the headspace, of external atmosphere and to minimise escape of protective atmosphere from the headspace.

The apparatus illustrated in FIGURE 10 may be modified by employing the inlet end wall 18 with one foot 25 illustrated in FIGURE 4.

The inlet end wall 18 may be vertically adjustable. For example, in the construction illustrated in FIGURES 1 and 2, in order to accommodate different thicknesses of the ribbon of glass delivered to the bath and advancing under the inlet end wall 18, this end wall 18 may be vertically adjustable to vary the height of the lower face of the end wall 18 above the surface 15 of the bath, that is, the height of the inlet channel 25. In such a construction the ledges 27 may be separate members anchored to the tank side walls but floating in the bath so that they remain in contact with the underface of the end wall 18 as it is raised or lowered vertically. Thus a desired spacing between the lower face of the end wall 18 and the upper surface of the glass can be maintained.

Normally the protective gas supplied under pressure to the pipes 29, 48, 50 and 66 is the same gas as that of the protective atmosphere supplied to the headspace through the headers 21, but the protective gas supplied to the pipes 29, 48 and 50 may be different from the protective atmosphere in the headspace.

By creating laminar flow of protective gas through the inlet and outlet channels for glass to and from the molten bath contamination of the protective atmosphere maintained in the headspace over the bath is substantially avoided thereby avoiding contamination of the metal bath by products of reaction between contaminants of the atmosphere and the bath.

The invention also comprehends flat glass produced on a bath of molten metal by any of the methods described above and sheets of glass cut from the flat glass.

We claim:

1. Apparatus for the manufacture of flat glass in ribbon form comprising a tank structure containing a bath of molten metal, a roof structure defining a headspace over the bath, means for supplying protective atmosphere to said headspace and for maintaining therein a plenum of said atmosphere, means for delivering glass to the bath through an inlet and for advancing the glass along the the bath towards an outlet through which the glass in ribbon form is discharged from the bath, said outlet being at or above the level of the bath and providing a smooth narrow elongated surface over and sufficiently close to the position of a glass ribbon to be advanced therethrough to form a laminar gas-flow passageway between said surface and said ribbon, gas ejection means extending transversely of said ribbon and disposed in said surface, and means for supplying pressurized gas for said ejection means.

2. Apparatus as in claim 1 wherein said outlet also provides a smooth narrow elongated surface under and sufficiently close to the position of a glass ribbon to be advanced therethrough to form a laminar gas-flow passageway between the last-mentioned surface and said ribbon, gas ejection means extending transversely of said ribbon and disposed in the last-mentioned surface, nad means for supplying pressurized gas for said ejection means.

3. Apparatus as in claim 2 wherein said inlet provides a smooth narrow elongated surface over and sufficiently close to the position of glass-flow therethrough to form a laminar gas-flow passageway between said surface and said glass-flow, gas ejection means extending transversely of said glass-flow and disposed in the last-mentioned surface, and means for supplying pressurized gas for said ejection means.

4. Apparatus as in claim 3, wherein at least one of said ejection means is arranged to direct gas outwardly to set up outward laminar flow.

5. Apparatus as in claim 1 wherein said inlet provides a smooth narrow elongated surface over and sufficiently close to the position of glass-flow therethrough to form a laminar gas-flow passageway between said surface and said glass-flow, gas ejection means extending transversely of said glass-flow and disposed in the last-mentioned surface, and means for supplying pressurized gas for said ejection means.

6. Apparatus as in claim 1 wherein said ejection means is arranged to direct gas outwardly to set up outward laminar flow.

7. Apparatus as in claim 1 wherein said ejection means is arranged to direct gas inwardly to set up inward laminar flow.

8. Apparatus as in claim 1 wherein said ejection means is arranged to direct gas outwardly and inwardly to set up laminar flow in both directions.

9. Apparatus as in claim 1 wherein said ejection and supplying means comprises an adjustable apertured pipe.

10. Apparatus according to claim 1 wherein an outwardly extending flexible apron is provided beyond said surface so as to overlie the ribbon of glass to assist in sealing the outer edges of the outlet channel.

References Cited
UNITED STATES PATENTS 3,241,937  3/1966  Michalik et al. _____ 65—65

DONALL H. SYLVESTER, *Primary Examiner.*

A. D. KELLOGG, *Assistant Examiner.*